G. J. CAPEWELL.
HORSE NAIL.
APPLICATION FILED OCT. 4, 1913. RENEWED MAY 3, 1919.

1,324,795.

Patented Dec. 16, 1919.

WITNESSES:
Louis Lucia.
Marie E. Meyer.

INVENTOR.
George J. Capewell,
BY
Arthur B. Jenkins,
ATTORNEY.

UNITED STATES PATENT OFFICE.

GEORGE J. CAPEWELL, OF HARTFORD, CONNECTICUT.

HORSE-NAIL.

1,324,795.   Specification of Letters Patent.   Patented Dec. 16, 1919.

Application filed October 4, 1913, Serial No. 793,394. Renewed May 3, 1919. Serial No. 294,565.

*To all whom it may concern:*

Be it known that I, GEORGE J. CAPEWELL, a citizen of the United States, and a resident of Hartford, in the county of Hartford and State of Connecticut, have invented a new and Improved Horse-Nail, of which the following is a specification.

My invention relates to the class of devices above named, and an object of my invention, among others, is to provide a device of this class that shall have means for directing its course into the hoof, one that shall cause minimum injury to the hoof when driven to place, and one that shall possess sufficient rigidity to facilitate the driving operation.

One form of nail in the construction and use of which the objects herein set out, as well as others, may be attained, is illustrated in the accompanying drawings, in which,—

Prior to my invention it has been a practice, in the making of horse-nails, to bevel the point, but this has not been for the purpose of directing the course of the nail through the hoof but rather to influence its action when it passes from the softer interior of the hoof into contact with the hard outer portion forming the surface layer of the hoof, so that instead of turning and remaining underneath this hard layer it will turn directly out through the layer. The beveling on the point to effect this result is such as to cause liability of this hard outer shell to be chipped or cracked off owing to the force exerted by the beveled point upon this surface, and the resistance of such surface to the passage of this beveled point, with a result that undue injury to the hoof occurs.

With my improved nails illustrated and described herein, I so construct the point that the course of the nail through the hoof is predetermined, and instead of taking a substantially straight course in the hoof and the final bending of the extreme point, as in the old nails above described, the nail for a substantial part of its length will be curved, the point taking a curved course immediately after it enters the hoof 8 with a result that when the point reaches the hard outer shell 9 its course has been defined without dependence upon said shell and with a result that it passes with certainty directly through the shell, without material injury thereto, as by chipping or cracking off the outer surface.

My improved nail also insures that the points of several nails will pass through this hard outer surface substantially at equal distances from the bottom of the hoof, and this avoids repeated withdrawings of the nail in an effort of the horse-shoer to so direct them through the hoof that they will all appear in line substantially parallel with the bottom of the hoof to present a neat and finished operation.

In securing this result, I construct my improved nail with a pointed end that is bent as at 5 to provide a point 6 disposed in the direction which it is desired the point shall take when driven into the hoof. I am thus enabled to give to the nail a gradual taper from the point toward the head so that the point for a substantial distance from this end shall be of minimum dimensions as to width with a result that when the point passes through the hard outer surface of the hoof it encounters little resistance and therefore exerts little force upon this hard outer surface tending to split it off.

Figure 1:
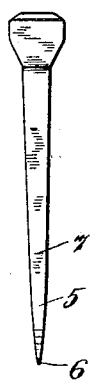
Figure 1 is a face view of a nail embodying my invention.
Figure 2:
Fig. 2 is an edge view of the same.
Figure 3:
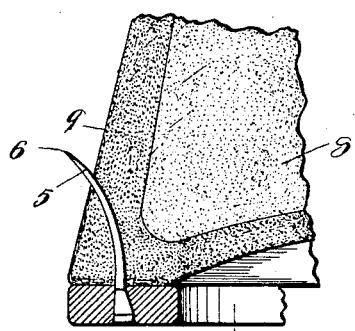
Fig. 3 is a view in section through a portion of a hoof illustrating the action of the nail when driven to place.

It will thus be seen that my improved nail partakes of the advantages incident to a curved point and at the same time it possesses qualities whereby the blows upon the head will be efficient in such a curved nail to a maximum degree for the reason that such blows delivered on the head will pass along the major portion or shank of the body of the nail (as denoted by the dotted line *a—a* in Fig. 2) and in direct line with the point, or rather the point is in direct line with the force of the blows passing along the body portion of the nail and therefore receives the force applied along such line.

In order to give to the nail thus constructed sufficient rigidity to enable it to be readily driven, I provide a reverse bend 7 located between the bend 5 and the head of the nail, so that the extreme point will lie in a plane extending substantially through the center of the nail lengthwise thereof and consequently in the line of force of the blows delivered on the head.

I claim—

1. A horse-nail including a head at one end for driving purposes and a point at the opposite end, the major portion of the nail body being substantially straight and flat, the pointed end of the nail being located on a curve, a part of which is located entirely at one side of a plane passing through the head and said major portion of the nail lengthwise thereof, and the point being located in said plane.

2. A horse-nail having its body substantially straight and flat as to the major portion thereof and gradually thinned and narrowed to a sharp point, this point being disposed on a curve formed to locate the extreme point in a plane extending through the head and said major portion of the nail lengthwise thereof, the opposite end of the nail having a head constructed for driving purposes.

3. A horse-nail including a body having one end constructed for driving purposes, and its opposite end bent to direct the course of the nail into a hoof, the outer surface of the bent portions of the nail on opposite sides conforming substantially one to the other, said nail also having a reverse bend located between the bent point and the head to locate said point in a plane extending through the head and body portion of the nail above said reverse bend that is located at one side of said plane.

GEORGE J. CAPEWELL.

Witnesses:
 ARTHUR B. JENKINS,
 E. F. EATON.